United States Patent [19]

Feldmann et al.

[11] 4,034,786
[45] July 12, 1977

[54] WHEEL CHUCK

[75] Inventors: Robert G. Feldmann, Minneapolis; James A. Safar, St. Michael, both of Minn.

[73] Assignee: Royal Industries, Inc., Osseo, Minn.

[21] Appl. No.: 632,300

[22] Filed: Nov. 17, 1975

[51] Int. Cl.² .................. B25H 1/00; B60C 25/06
[52] U.S. Cl. ................... 144/288 A; 156/96; 157/1.24
[58] Field of Search ............... 279/2 R, 1 W, 106; 157/1.17, 1.24; 156/95, 96; 144/288 R, 288 A, 288 B, 288 C; 248/2

[56] References Cited

U.S. PATENT DOCUMENTS

| 2,923,347 | 2/1960 | Bishman | 157/1.24 |
| 2,948,314 | 8/1960 | Bishman | 144/288 A |
| 3,156,480 | 11/1964 | Wuesthoff | 144/288 A |
| 3,891,019 | 6/1975 | Holladay | 144/288 A X |

FOREIGN PATENT DOCUMENTS

| 670,188 | 4/1952 | United Kingdom | 144/288 A |

Primary Examiner—Othell M. Simpson
Assistant Examiner—W. D. Bray
Attorney, Agent, or Firm—Warren A. Sturm

[57] ABSTRACT

A wide range wheel chuck in which three wheel engaging chucks are disposed on the ends of three lever arms. The lever arms are rotatably journaled at the other end to a stationary base and at a point intermediate their ends to a base that is rotatable with respect to the stationary base. Relative movement between the bases results in simultaneous equal radial motion of the chuck jaws at the first ends of the lever arms.

11 Claims, 4 Drawing Figures

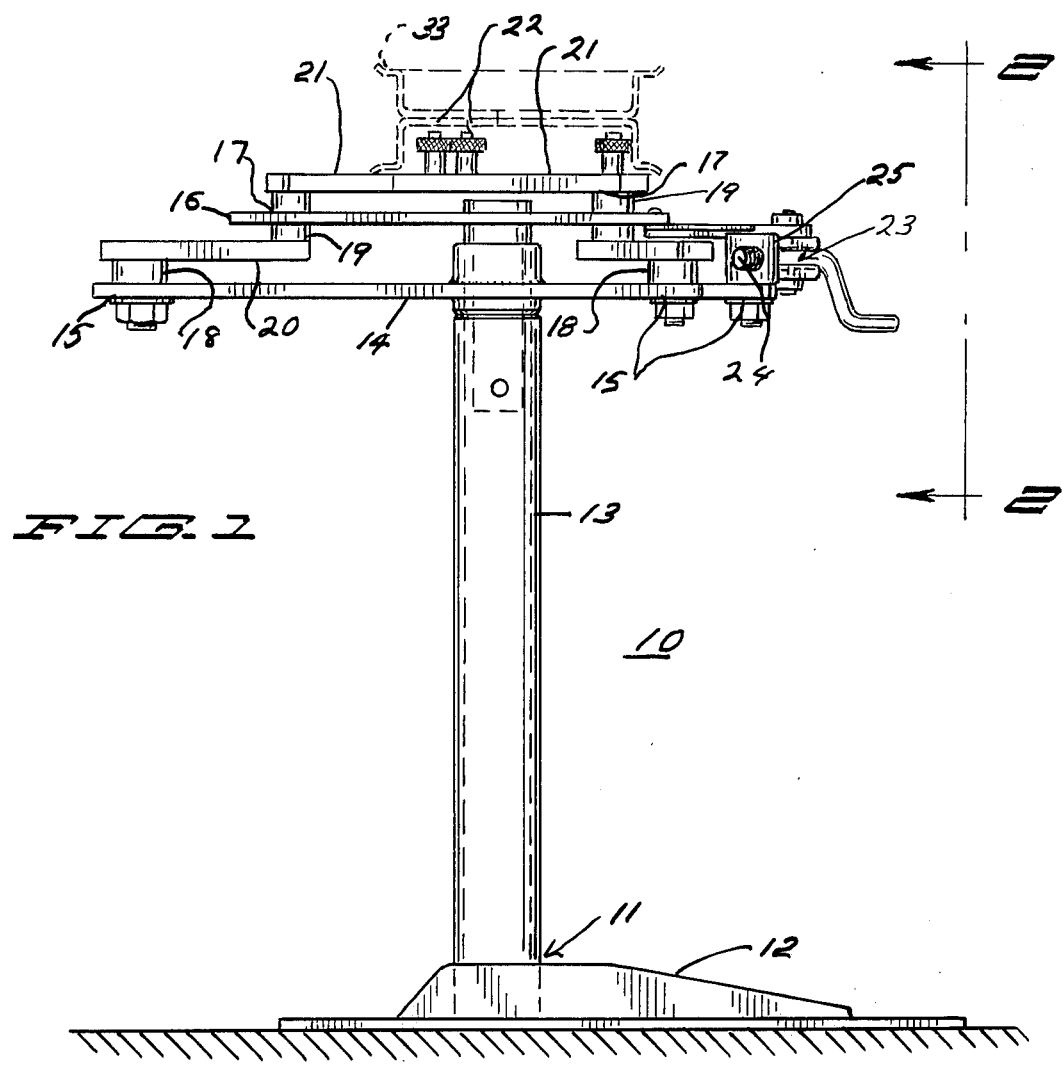
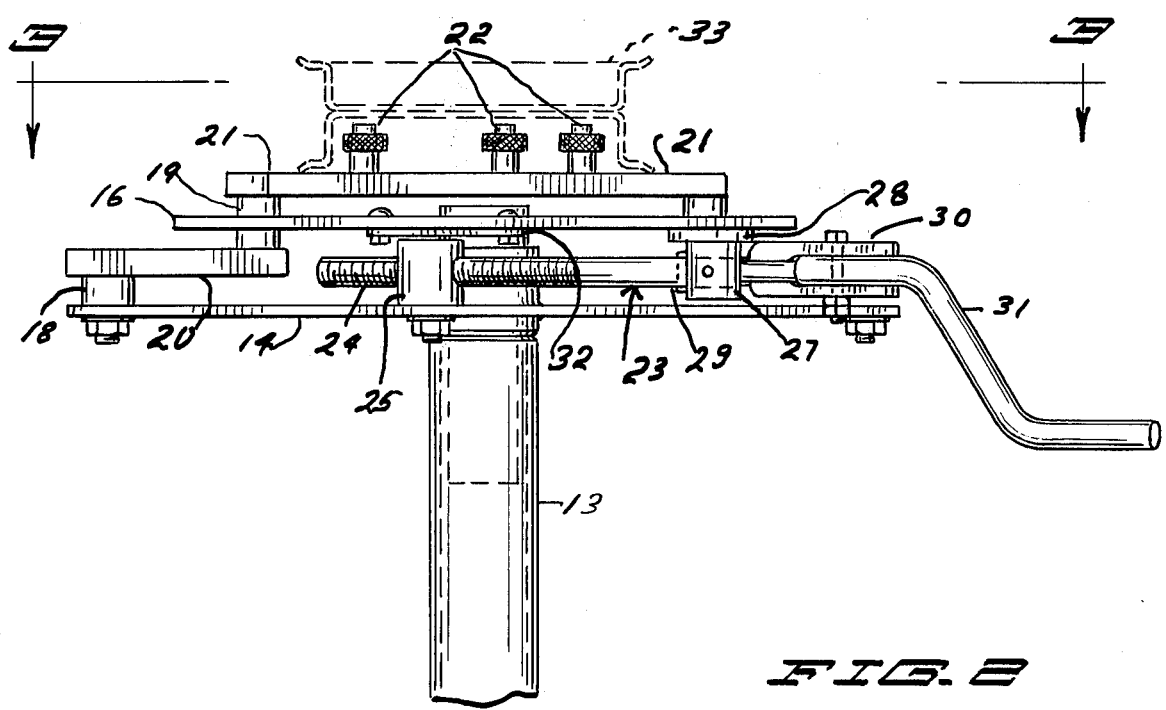

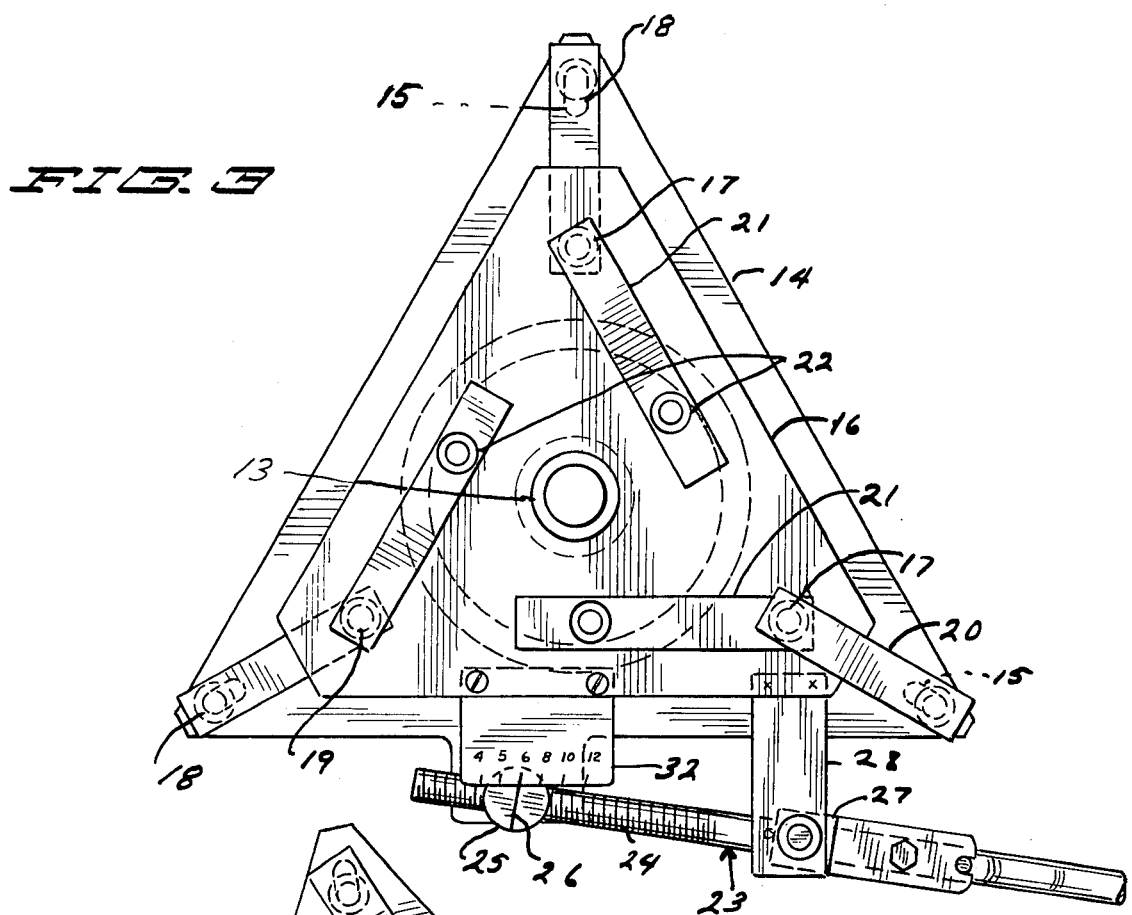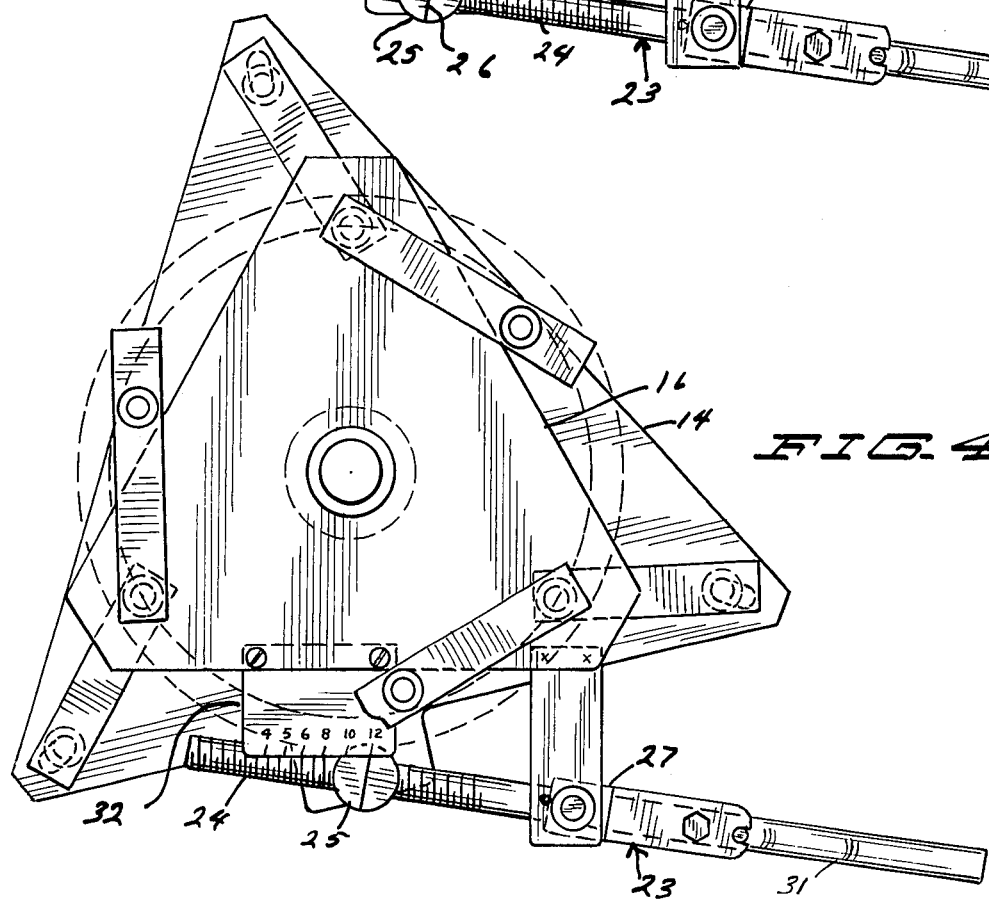

WHEEL CHUCK

BACKGROUND OF THE INVENTION

1. Field of the Invention

This invention relates to a wheel chuck to be used in connection with a mechanism for mounting and demounting and/or inflating a tire upon a wheel.

2. Description of the Prior Art

In the development of machines and apparatus for mounting and demounting and inflating tires upon a wheel, very little consideration has been given to the development of a wide range wheel chucking arrangement for such apparatus. Prior art apparatus has included numerous other forms of chucking apparatus and arrangements. However, with the more or less recent development and wide-spread usage of tires and wheels having a variety of sizes and relative diameters, the general form of apparatus presently known to be available has not satisfied a desire for an uncomplicated and efficient chucking arrangement to cover a large range of sizes of wheels. Examples of prior art apparatus used are multijawed wheel chucking arrangements which are limited to a relatively narrow range of sizes of wheels that may practically be serviced or may be of the collet chuck or cone type of wheel mounting apparatus which is limited in its application because of the necessity of having the apparatus extending through the center aperture of a wheel rather than gripping it around the inner periphery of the rim.

SUMMARY OF THE INVENTION

This invention relates to a novel and improved wheel chucking apparatus which reliable, economically, and operationally provides a wheel chucking function to center the axis of rotation of a wheel about the axis of a support base member whereby operations requiring concentricity may be performed as, for example, mounting a wheel and tire on a stationary base, removing, repairing and replacing the tire on the wheel prior to reinflation while presenting a capability of handling a wide range of sizes of wheels with respect to the rims thereof regardless of the size of the center aperture in said wheels.

Other objects and advantages of our invention will become apparent from a consideration of the appended specification, claims and drawings in which:

FIG. 1 is a side elevational view of the elements of a basic wheel chucking device;

FIG. 2 is an enlarged side elevation of the apparatus of FIG. 1 looking at it along section line 2—2;

FIG. 3 is a top plan view showing the various components of our invention in a first attitude; and FIG. 4 is a similar view showing the components of our invention at a second attitude.

DESCRIPTION OF THE PREFERRED EMBODIMENT

Referring now to the drawings, there is shown a fragmentary side elevational view of a tire mount-demount machine or apparatus indicated generally by reference character 10. A number of the operational aspects of the tire mount-demount apparatus have been omitted for the sake of clarity and it will be understood that the bead breaking, tire mounting and inflation of a tire and wheel may be accomplished by any one of many suitable devices and apparatus.

Tire mount-demount machine 10 includes a base indicated generally by reference character 11 which includes a bottom plate 12 that is adapted to be securely mounted on a work surface and a tubular upwardly extending upright portion or support 13.

A triangular base 14 is shown disposed in a plane substantially perpendicular to the longitudinal axis of tubular upright 13 and may be nonrotatably and stationarily disposed on the top end thereof by suitable means, such as welding or the like. Base 14 includes a plurality of apertures 15 disposed at each corner, and it may be noted that these apertures may be elongated and are spaced apart equidistance circumferentially of the center axis to tubular upright 13.

A further base member 16 also lying in a plane that is perpendicular to the longitudinal axis of tubular upright member 13 and generally parallel to base 14 is also shown as having a triangular configuration and being rotatably mounted or disposed on the top of upright 13 for rotation about the axis thereof.

Base 16 includes a like plurality of apertures 17 at each of its corners and it may be noted that these apertures are likewise spaced equidistantly, angularly, radially, and circumferentially with respect to the longitudinal axis of tubular upright member 13.

A like plurality of pin members 18 are rotatably journaled in apertures 15 on base 14 and may be seen to be held in place by suitable means, such as washers and nuts, as shown on FIG. 1 of the drawings. A like plurality of pins 19 are shown rotatably disposed in the apertures 17 in base 16.

A further like plurality of links 20 are shown extending between pins 18 and 19 and are rigidly attached thereto by suitable means, such as welding or the like. Links 20 are positioned intermediate base 14 and base 16. A further like plurality of links 21 are shown disposed on top of pins 19 at one end and are attached thereto by suitable means, such as welding or the like. The other ends of links 21 are provided with upwardly extending jaws 22 which, it may be seen, may be knurled or otherwise provided with suitable gripping surfaces for engaging the inner surfaces of the rim of a wheel while at the same time supporting the edge of the rim of a wheel on the top of links 21.

A crank assembly for imparting relative movement between base 14 and base 16 is indicated generally by reference character 23. Crank 23 is provided with threads 24 at its left end in FIG. 2 and is provided with a drive member 30 that is in turn driven by a crank handle 31. This portion of crank 23 is provided to allow disengagement of crank handle 31 from crank 23 so as to allow easy access without interference to a wheel and tire after it has been engaged by chuck jaws 22. Referring again to FIG. 2, the left end of crank 23 extends through an internally threaded aperture in nut 25 that is rotatably disposed in a suitable aperture in base 14. A further portion of the operating mechanism includes a bearing member 27 through which the major portion of crank 23 extends and is rotatably journaled therein, and is itself rotatably disposed on the end of an arm 28 extending outwardly from a portion of movable base 16. It may be seen that the major portion of crank 23 is rotatable but not axially movable through bearing 27 because of the presence of pin 29 and drive 30.

It may also be noted that the top of element 25 includes an indicia 26 that is adopted to cooperate with a further scale 32 having appropriate indicia corresponding generally to the diameter of a wheel, so that the operator may know the relative positions of the chuck jaws 22 at any given time.

When it is desired to stationarily nonrotatably engage the rim of a wheel and tire, the wheel is placed upon the top of the illustrated apparatus and the handle of the crank is rotated in a direction which will cause the chuck jaws 22 to expand. This automatically centers the axis of the wheel, and therefore the rim, about the center longitudinal axis of upright member 13. This allows for the utilization of appropriate mounting and demounting devices and apparatus, as well as tire inflating devices and apparatus.

We claim:

1. In a tire mounting and demounting machine, wheel chucking apparatus comprising:
   a longitudinally elongated support member having opposing ends, one end being adapted to be mounted in a work area;
   a first base means disposed on the other end of said support member;
   a second base means also disposed on said other end of said support member, said first and second base means lying in parallel planes that are normal to the longitudinal axis of said support member, said first and second base means being rotatable with respect to each other; said first and second base means including like pluralities of circumferentially spaced apart apertures;
   a like plurality of first links having opposed ends, each having a like plurality of pins rigidly mounted at each end, the pins at one end extending into the apertures in one of said first and second base means and the pins at the other end extending into the pertures in the other of said first and second base means;
   a like plurality of second links having opposed ends, each having one end mounted on the pin at said other end of said first links and a wheel engaging jaw extending through the other end of said second link; and
   means for establishing relative movement between said first and second base means.

2. The apparatus of claim 1 in which the apertures in the first base means are radially elongated with respect to the longitudinal axis of the support member.

3. The apparatus of claim 1 in which there are three sets of links, pins and jaws.

4. The apparatus of claim 2 in which there are three sets of links, pins and jaws.

5. The apparatus of claim 1 in which the first base means is stationarily mounted on the other end of the support member.

6. The apparatus of claim 1 in which the second base means is rotatably mounted on the other end of the first base.

7. The apparatus of claim 5 in which the second base means is disposed on top of the first base means.

8. The apparatus of claim 7 in which the second links are disposed on top of the second base means.

9. The apparatus of claim 8 in which the engaging jaws extend upwardly from the top of the second links.

10. The apparatus of claim 3 in which the first base means is stationarily mounted on the other end of the support member.

11. In a tire mounting and demounting machine, wheel chucking apparatus comprising:
    a base support and first and second base means carried parallel to one another on the base support with one base means being rotatable with respect to the other base means about a stationary axis;
    the second base means having a plurality of circumferentially spaced bearing apertures therethrough;
    linkage means comprising a like plurality of pins rotatably mounted in the apertures of the second base means; a like plurality of first links having opposed ends, each link being joined at one end to a respective pin and at the other end to the first base means; and a like plurality of second links having opposed ends, each being joined at one end to a respective pin and having a wheel engaging jaw means at the other end;
    means for rotating one base means with respect to other base means about the stationary axis to cause unison movement of the jaws means.

* * * * *